United States Patent
Mills et al.

(10) Patent No.: US 6,222,457 B1
(45) Date of Patent: Apr. 24, 2001

(54) ELECTRONIC TRAILER HITCHING SYSTEM

(75) Inventors: Gregory Taylor Mills, Bloomfield, MI (US); Stephen Scott Keneally, 99 Derby St., Suite 200, Hingham, MA (US) 02043

(73) Assignee: Stephen Scott Keneally, Wayland, MA (US)

( * ) Notice: Subject to any disclaimer, the term of this patent is extended or adjusted under 35 U.S.C. 154(b) by 0 days.

(21) Appl. No.: 09/415,929

(22) Filed: Oct. 12, 1999

(51) Int. Cl.[7] .................................................. G08B 21/00
(52) U.S. Cl. ...................... 340/686.1; 340/431; 340/687; 340/691.6; 340/693; 33/264; 250/491.1; 280/477
(58) Field of Search ................................ 340/431, 686.1, 340/687, 691.6, 693; 280/477, 504; 33/264, 286; 250/491.1

(56) References Cited

U.S. PATENT DOCUMENTS

| | | | |
|---|---|---|---|
| 3,767,292 | * 10/1973 | Rutkowski | 359/871 |
| 4,156,972 | * 6/1979 | Vankrevelen | 280/477 |
| 4,199,756 | 4/1980 | Dito . | |
| 4,254,968 | 3/1981 | DelVecchio . | |
| 4,552,376 | 11/1985 | Cofer . | |
| 4,560,183 | 12/1985 | Cook . | |
| 4,852,901 | 8/1989 | Beasley et al. . | |
| 4,893,829 | 1/1990 | Davis . | |
| 5,035,441 | 7/1991 | Murray . | |
| 5,108,123 | 4/1992 | Rubenzik . | |
| 5,180,182 | 1/1993 | Haworth . | |
| 5,309,289 | 5/1994 | Johnson . | |
| 5,455,557 | 10/1995 | Noll et al. . | |
| 5,650,764 | 7/1997 | McCullough . | |
| 5,729,194 | 3/1998 | Spears et al. . | |
| 5,861,814 | 1/1999 | Clayton . | |

\* cited by examiner

*Primary Examiner*—Daniel J. Wu
(74) *Attorney, Agent, or Firm*—Harness, Dickey & Pierce, P.L.C.

(57) ABSTRACT

A trailer hitching system (10) and method is provided for facilitating an operator's maneuvering of a towing vehicle hitch component (16) into alignment with a towed vehicle hitch component (18) to enable mechanical interconnection of the hitch components. The trailer hitching system (10) includes an alignment sensor (24) attached to either the towing vehicle (12) or the towed vehicle (14) for emitting a light beam over a field of view. A reflector (32) attached to the other of the towing vehicle (12) or the towed vehicle (14) is mounted at a predetermined location relative to the alignment sensor (24). The reflector (32) reflects a portion of the light beam emitted from the alignment sensor (24). An alarm (46) in the alignment sensor (24) emits an audible alarm in response to detecting a portion of the reflected light beam. The activation of the audible alarm indicates that the reflector (32) is within the field of view of the alignment sensor (24) and thereby the hitch components (16 and 18) are moving towards alignment.

18 Claims, 5 Drawing Sheets

ELECTRONIC TRAILER HITCHING SYSTEM

TECHNICAL FIELD

This invention relates generally to trailer hitching systems and, more particularly, to an electronic sensor system for aligning a vehicle and a trailer in preparation for hitching.

BACKGROUND OF THE INVENTION

For many years now vehicles that are temporarily connected to trailers have been used to transport boats, off-road vehicles, lawn maintenance equipment, and other vehicles. Generally, a hitch assembly connected to the towing vehicle and trailer is employed to permit their interconnection. Aligning the hitch assembly of the towing vehicle with the hitch assembly of the trailer is often a time-consuming and frustrating endeavour. This is especially so when the trailer is so heavy that it cannot be moved by an individual to compensate for minor misalignments of the hitching assemblies. In response to the continued nuisance associated with attempting to align hitching components, numerous hitching system alignment aids have been developed. Examples of some of the more common approaches include, mirrors attached to the rear of the towing vehicle for providing a view of the hitch assemblies, cameras mounted to provide a video picture of the hitch assemblies, metal guide plates attached to the towing vehicle hitch assembly to force lighter trailers into alignment, and electronic sensor assemblies. Each of the prior art approaches falls short of providing an accurate, low-cost, portable, all-weather, easy-to-use hitching system.

Hitching systems employing mirrors generally are mounted to the rear of the towing vehicle and provide the vehicle operator a view of the hitch assemblies during the alignment operation. To be effective mirrors must typically be of the relatively large convex variety making storage difficult and replacement relatively costly. Additionally, mirrors require favourable viewing conditions; therefore nighttime operation and bad-weather operation are problematic.

Camera assemblies that are used in hitching systems provide the operator with a video display to assist in the alignment of the hitch assemblies. In addition to usually requiring daytime operation and good weather, camera assemblies are very expensive and require time-consuming assembly and disassembly each time the hitching system is used.

Metal guideplates by their very nature are limited to use with the class of trailers wherein aligning the hitching assemblies is the least problematic. The guideplates are situated between a vehicle and the ball-hitch in the shape of a "V". As the vehicle is backed-up, a slightly misaligned trailer hitch component will impact the guideplate and be guided in towards the ball-hitch. As the trailer hitch component is guided inward, the trailer pivots about its tires. Due to the necessity for shifting the position of the trailer, the guideplate system is limited to use with lighter weight trailers. Using guideplates with heavier trailers may lead to either the guideplate breaking away from the vehicle or the vehicle being shifted, placing undesirable lateral forces upon the vehicle wheels.

Conventional hitching systems that rely on electronic circuits employ sensor assemblies such as magnetically activated switches, autofocus assemblies, and light reflective assemblies. Generally, output signals from the various sensors are received by a processor, which calculates the relative distance from the towing vehicle to the towed vehicle and provides an output to the operator. To receive power, the processor and some of the sensor assemblies are typically wired to the towing vehicle power subsystem. Connecting to the vehicle power requires the system to be semi-permanently installed with an associated installation cost in addition to the cost of the electronic assemblies.

Therefore, it is desirable to provide a hitching system for facilitating an operator's maneuvering of a towing vehicle to align the vehicle hitch component with a trailer hitch component carried on a towed vehicle. Also, it is desirable for the hitching system to be operational during bad weather and at night. Additionally, a low-cost, portable system is desirable. It would also be desirable to provide a system that is operational with virtually all types of towing vehicles and trailers.

SUMMARY OF THE INVENTION

In accordance with the teachings of the present invention a trailer hitching system and method is provided for facilitating an operator's maneuvering of a towing vehicle hitch component into alignment with a towed vehicle hitch component to enable mechanical interconnection of the hitch components. The trailer hitching system includes an alignment sensor attached to either the towing vehicle or the towed vehicle for emitting a light beam over a field of view. A reflector attached to the other of the towing vehicle or the towed vehicle is mounted at a predetermined location relative to the alignment sensor. The reflector reflects a portion of the light beam emitted from the alignment sensor. An alarm in the alignment sensor emits an audible alarm in response to detecting a portion of the reflected light beam. The activation of the audible alarm indicates that the reflector is within the field of view of the alignment sensor and thereby the hitch components are moving towards alignment.

BRIEF DESCRIPTION OF THE DRAWINGS

Other objects and advantages of the present invention will become apparent to those skilled in the art upon reading the following detailed description and upon reference to the drawings in which.

DESCRIPTION OF THE PREFERRED EMBODIMENT

Figure 1:
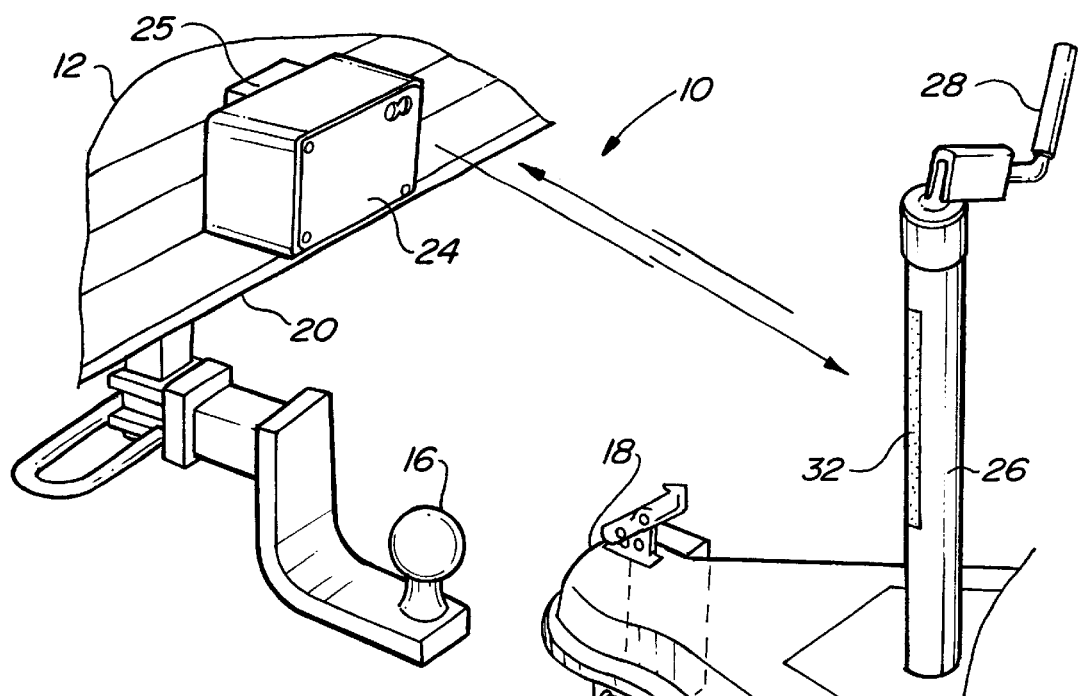
FIG. 1 is a perspective view partially showing the presently preferred embodiment of the electronic hitching system.

Referring to FIG. 1, an exemplary electronic hitching system 10 is illustrated. The electronic hitching system 10 is designed to facilitate a vehicle operator in aligning the hitch components of a towing vehicle 12 and a towed vehicle 14. Regardless of weather, lighting, or ground-surface conditions the hitching system 10 enables the vehicle operator to quickly and easily align the hitch components of the towing and towed vehicles 12 and 14. In addition, the presently preferred embodiment is a wireless system, thereby minimizing the period of time required for assembly and increasing the portability and storability of the hitching system 10.

The towing vehicle 12 includes a ferrous metal bumper assembly 20, below which a towing vehicle hitch component 16 mounts. In the presently preferred embodiment, the towing vehicle hitch component 16 is a ferrous-metal hitch-ball although other types of hitch components are within the scope of the invention such as non-metallic hitch components and ball-receivers. Attached to the bumper 20 of the towing vehicle is an alignment sensor 24 for detecting the presence of the towed vehicle 14 and providing an audible alarm to the vehicle operator. The alignment sensor 24 detects the presence of the towed vehicle 14 by transmitting a beam of light outward from the rear of the towing vehicle 12 and detecting a portion of the beam of light that reflects from the towed vehicle 14. The alignment sensor 24 is located approximately above the towing vehicle hitch component 16, although other mounting locations are within the scope of the invention as will be described later. In the presently preferred embodiment the alignment sensor 24 is attached to the towed vehicle 14 by means of a magnet 25 that is affixed to the alignment sensor 24, however using other means of attachment are within the scope of the invention including bolts and Velcro tape. Additionally, providing a bracket for extending the alignment sensor 24 out from the bumper 22 such as to a position directly over the towing vehicle hitch component 16 is within the scope of the invention.

Figure 3:
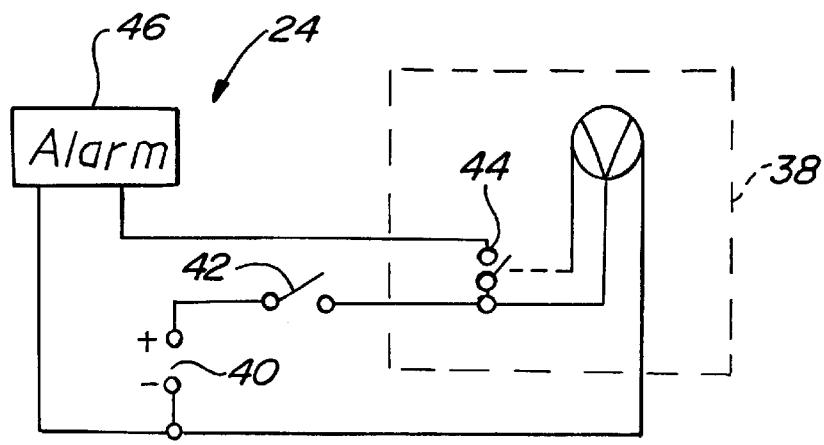
FIG. 3 is a schematic diagram of an alignment sensor constructed in accordance with the teachings of the invention.
Figure 4:
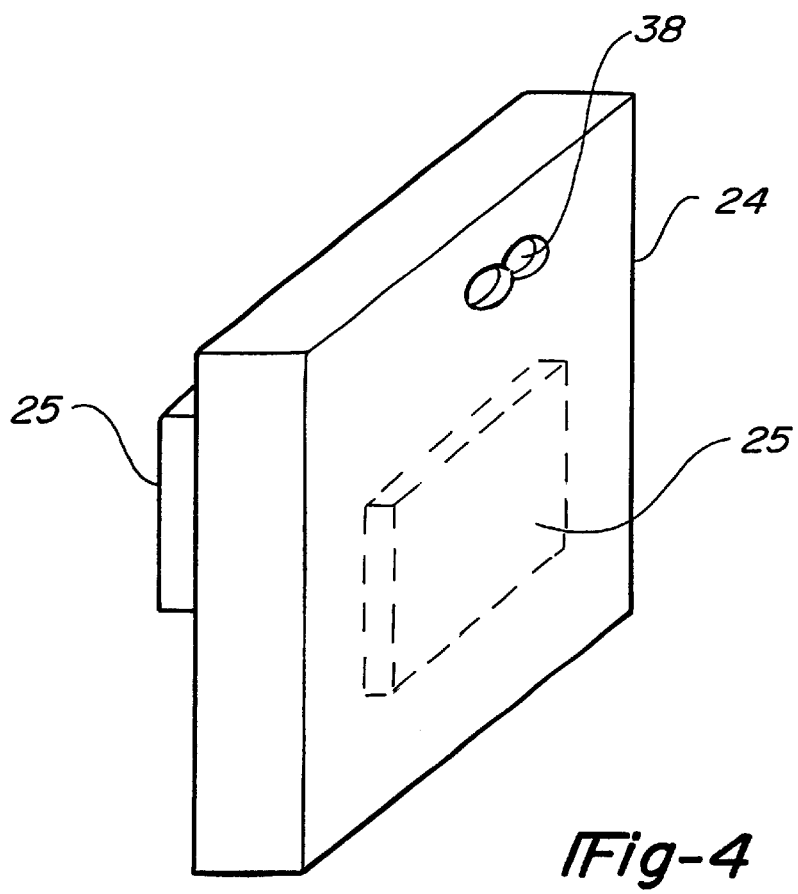
FIG. 4 is a perspective view of an alignment sensor made in accordance with the teachings of the presently preferred embodiment of the invention.

Referring to FIGS. 3 and 4, schematic and perspective views respectively of the alignment sensor are illustrated. The alignment sensor 24 includes a photo-switch assembly 38 for transmitting a beam of light over a predetermined field of view and receiving a reflected portion of the beam of light. The photo-switch assembly 38 is preferably an infrared, echo mode, retro-reflective photo-switch such as an Allen-Bradley 42SMU7601 having a field of view of 5 degrees and an effective operating distance of approximately 8 feet. However, the scope of the invention includes photo-switches that operate from visible red through infrared with a field of view approaching 90 degrees. The photo-switch assembly 38 includes a light detect switch 44 that is controlled in response to reflected light being detected. Although in the preferred embodiment the light detect switch provides a constant output for detected light exceeding a predetermined intensity, it is within the scope of the invention to employ a photo-switch assembly that provides a light detect switch output that is proportional to the intensity of the detected light. A battery 40 and control switch 42 connect in series with the photo-switch assembly 38 to provide controlled circuit power to the alignment sensor 24. An alarm 46 connected to the output of the light detect switch 44 provides an audible indication when the photo-switch assembly 38 detects reflected light.

Figure 2:
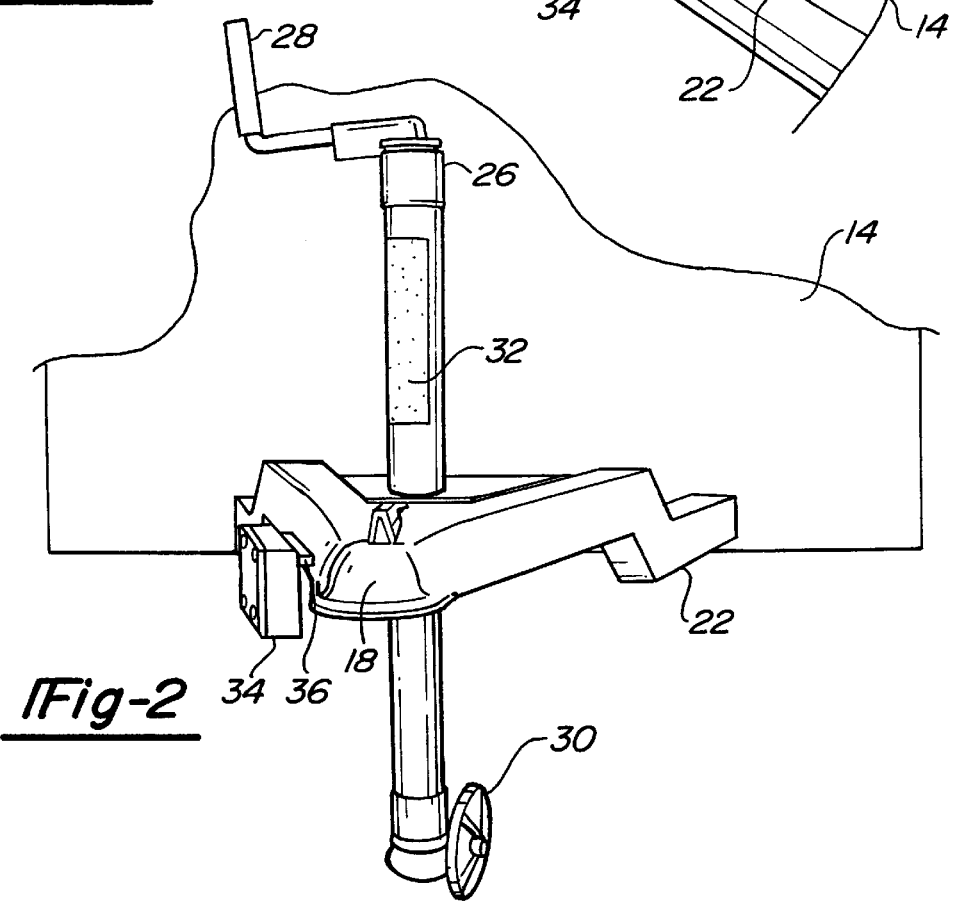
FIG. 2 is a perspective view partially showing a reflector and a proximity sensor attached to a towed vehicle.

Referring to FIGS. 1 and 2, the towed vehicle 14 includes a towed vehicle hitch component 18 attached to a ferrous-metal trailer tongue 22 for permitting the towed vehicle 14 to be hitched to the towing vehicle 12. In the presently preferred embodiment, the towed vehicle hitch component 18 is a ferrous-metal ball-receiver, although employing the hitching system with other hitch components such as non-metallic hitch components and hitch-balls is within the scope of the invention. An adjustment shaft 26, crank 28, and wheel assembly 30 attached to the trailer tongue provide a support point when the trailer is disconnected from the towing vehicle.

In the presently preferred embodiment a retro-reflective reflector 32 is attached to the towed vehicle such that incident light emitted from the alignment sensor 24 is reflected back towards the towing vehicle along a path that is parallel to the incident light. Although a 1½" wide retro-reflective reflector is employed in the presently preferred embodiment, using other reflectors and other widths of reflectors are within the scope of the invention. The reflector 32 employed in the presently preferred embodiment is attached to the forward portion of the adjustment shaft 26, although other locations on the towing vehicle are within the scope of the invention so long as a suitable mounting relationship is maintained between the reflector 32 and the alignment sensor 24.

Figure 5:
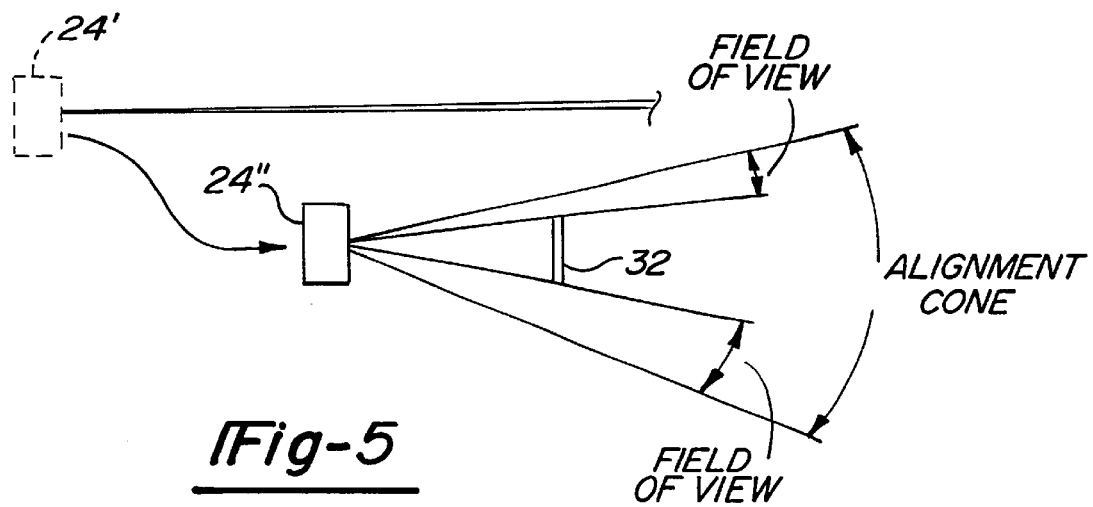
FIG. 5 is a depiction of an alignment cone that projects from an alignment sensor.
Figure 6:
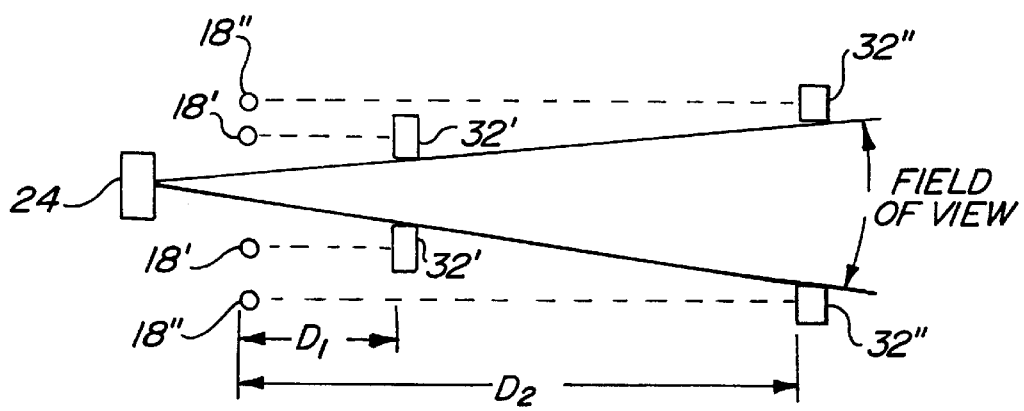
FIG. 6 is an overview illustrating several factors that have an impact on alignment accuracy.

A suitable mounting relationship is maintained by arranging the alignment sensor 24 and the reflector 32 such that an axis drawn through them runs parallel to an axis drawn through the hitch components 16 and 18 when they are in cooperative alignment. With reference to FIGS. 5 and 6, the effect of mounting relationship upon alignment accuracy is illustrated. The elements that define the accuracy of alignment include the field of view of the alignment sensor 24, the width of the reflector 32, the distance to the back that the reflector 32 is mounted from the towed vehicle hitch component 18, and the distance to the side that the alignment sensor 24 and reflector 32 are offset from the vehicle hitch components 16 and 18. Referring to FIG. 5, an alignment cone associated with the hitching system 10 is illustrated. The narrower the width of the reflector and the alignment sensor field of view, the narrower the alignment cone, and thereby the greater the alignment accuracy. However, reducing the reflector width and field of view to the minimum values would result in a thin pencil beam of light which would make it difficult for the vehicle operator to keep the reflector 32 within the alignment sensor field of view and thus make it very difficult to discern which direction to maneuver the vehicle 10 to attain alignment (see alignment sensor 24'). In the presently preferred embodiment, the alignment sensor field of view is approximately 5 degrees and the reflector width is about 1½ inches. This establishes a sufficiently wide alignment cone to enable the vehicle operator to reliably maneuver the vehicle 10 into alignment (see alignment sensor 24"). With reference to FIG. 6, the effect on alignment accuracy of the reflector mounting distance from the hitch component 18 is illustrated. The reflector 32 is depicted in two mounting positions, d1 (reflector 32') and d2 (reflector 32"), relative to the towed vehicle hitch component 18' and 18". As the distance of the reflector mounting position from the hitch component 18 increases, the alignment accuracy decreases due to an increased spread of the field of view. To minimize the inaccuracy related to the reflector mounting distance, the width of the reflector is decreased, reducing the offset from the edge of the field of view, which increases the alignment accuracy. Increased sideward offset distance has no effect on alignment accuracy when the towing vehicle and towed vehicle are square relative to each other, but sideward offset distance decreases the alignment accuracy if the vehicles are not square. To eliminate alignment inaccuracy from sideward offset, the vehicle operator need only ensure that both vehicles are somewhat square as the hitch components near alignment. For optimum alignment, the alignment sensor 24 has a narrow field of view, for example approximately 5 degrees, and is attached directly over the towing vehicle hitch component 16, the reflector 32 is approximately 2 inches wide and attached directly over the towed vehicle hitch component 18. However, acceptable performance is obtained by maintaining the previously described suitable mounting relationship.

Again referring to FIGS. 1 and 2, the towing vehicle includes a proximity sensor 34 attached to the trailer tongue 22. The proximity sensor 34 is mounted to the side of the towed vehicle hitch component 18 to permit detection of the towing vehicle hitch component 16 as it passes under the towed vehicle hitch component 18. In the preferred embodiment, the proximity sensor 34 is preferably attached to the trailer tongue 22 by means of a magnet 36 that is affixed to the proximity sensor 34. However, other means of attaching the proximity sensor 34 to the trailer 14 are within the scope of the invention, such as with bolts, Velcro, and adhesives. Although, the proximity sensor 34 of the present embodiment is rigidly affixed to the trailer tongue 22 with a magnet, it is within the scope of the invention to provide an adjustment means for the field of view to compensate for uneven mounting surfaces. For example, the detector assembly 50 may be adjustable with respect to the proximity sensor 34, or the magnet 36 may be affixed to the proximity sensor 34 with a mounting apparatus such that the sensor 34 is adjustable relative to the magnet 36.

Figure 7A:
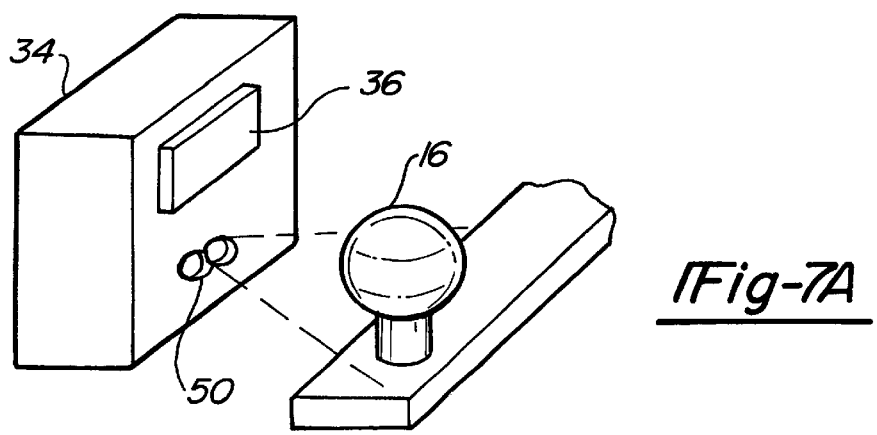
FIG. 7A is a perspective view of a proximity sensor constructed in accordance with the teachings of the presently preferred embodiment of the invention.
Figure 7B:
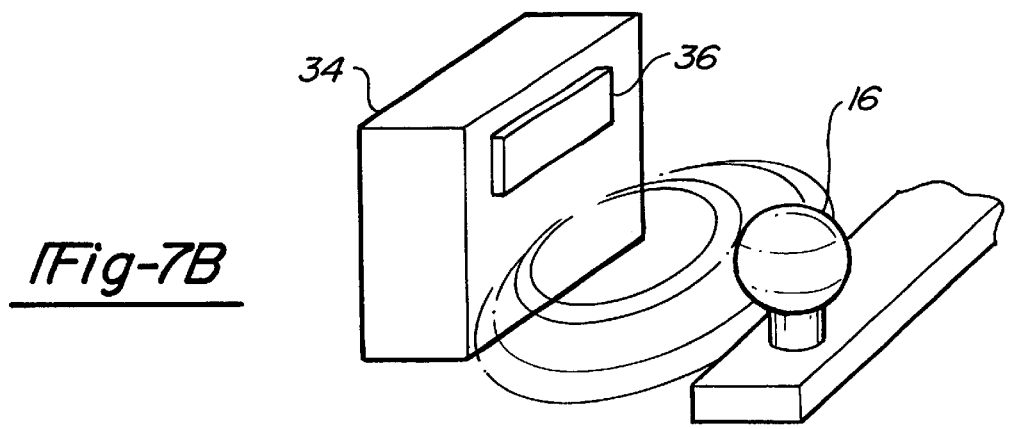
FIG. 7B is a perspective view of an alternative proximity sensor constructed in accordance with the teachings of the presently preferred embodiment of the invention.
Figure 8:
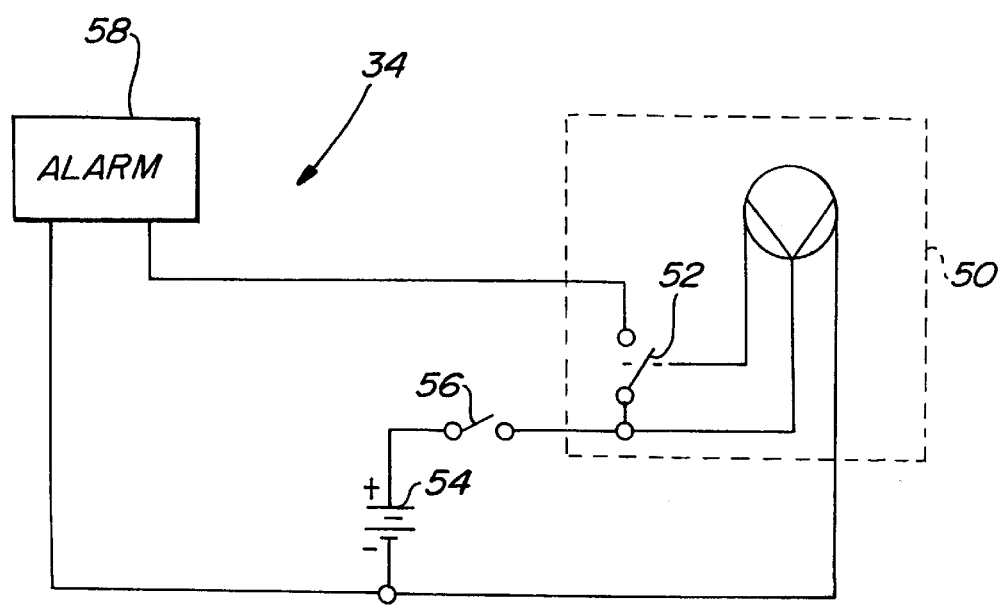
FIG. 8 is a schematic diagram of a proximity sensor constructed in accordance with the teachings of the invention.

Referring to FIGS. 7A and 8, a perspective view and schematic respectively of the proximity sensor are illustrated. The proximity sensor 34 includes a detector assembly 50 for detecting the presence of metal within a predetermined distance. The detector assembly 50 is preferably an infrared, echo mode, standard diffuse photo-switch such as an Allen-Bradley 42SMP7601. However, the scope of the invention includes inductive and magnetic metal detectors such as an Allen-Bradley 871F (see FIG. 7B), as well as ultrasonic sensors such as an Allen-Bradley 873C. The photo-switch version of the detector assembly 50 transmits a beam of light over a 6 degree field of view and detects portions of the light that are reflected off of any object within approximately 12 inches. The detector assembly 50 includes a detect switch 52 that is controlled in response to detecting light reflected from the towing vehicle hitching component 16. A battery 54 and control switch 56 connect in series with the detector assembly 50 to provide controlled circuit power to the proximity sensor 34. An alarm 58 connected to the output of the detect switch 52 provides an audible warning when the detector assembly 50 detects the presence of an object within the field of view.

Figure 9A:
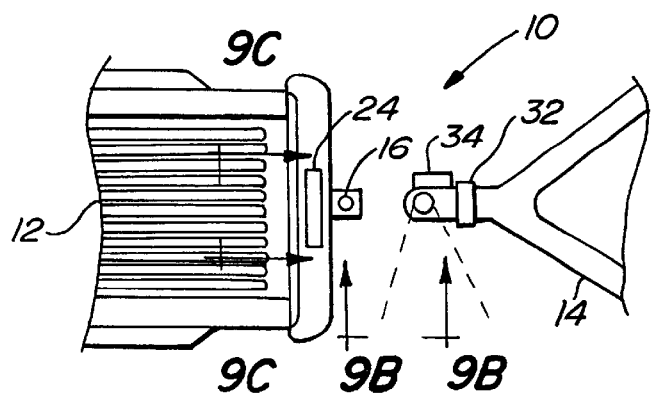
FIG. 9A is an overhead view of the presently preferred embodiment of the invention.

The presently preferred embodiment of the electronic hitching system 10 has two phases of operation, the alignment phase and the hitch component detection phase. Referring to FIG. 9A, prior to the alignment phase an alignment sensor 24, proximity sensor 34, and reflector 32 are mounted to the towing vehicle 12 and towed vehicle 14. The alignment sensor 24 is magnetically attached to the towing vehicle bumper assembly 20 to provide a beam of light having a field of view that extends outward over the towing vehicle hitch component 16. The reflector 32 is semi-permanently attached to an adjustment shaft 26 of the towed vehicle 14 to reflect the beam of light back towards the alignment sensor 24. The proximity sensor 34 is magnetically attached to the side of the towed vehicle trailer tongue 22 in order to sense the towing vehicle hitch component 16 passing under the towed vehicle hitch component 18.

With continued reference to FIG. 9A, during the alignment phase, as the vehicle operator slowly backs the towing vehicle 12 towards the towed vehicle 14 the alignment sensor 24 emits an audible beep so long as the reflector 32 is within the field of view of the alignment sensor 24. The alignment sensor 24 emits a beam of infrared light over a field of view of about 5 degrees. When the towing vehicle is maneuvered to bring the alignment sensor 24 within about 5 feet of the reflector 32, light emitted from the alignment sensor 24 reflects from the reflector 32 back along a path parallel to the incident light towards the alignment sensor 24. The photo-switch assembly 38 within the alignment sensor 24 detects the reflected light and in response controls the light detect switch 44 to supply power to an alarm 46. The alarm 46 provides a constant audible indication that reflected light is detected. Although the preferred embodiment is limited to distances of 5 feet, the scope of the invention includes greater distances that are obtained by higher power photo-switch assemblies 38. As the towing vehicle 12 nears the towed vehicle 14 the alignment cone narrows in width, leading the hitch components 16 and 18 towards alignment. By constantly adjusting the direction of the towing vehicle 12 to maintain the audible alarm and thereby remain within the alignment cone, the vehicle operator brings the hitch components 16 and 18 towards alignment. The alignment sensor alarm 46 continues to provide an audible alarm as the towing vehicle hitch component 16 passes under the towed vehicle hitch component 18. Although, in the presently preferred embodiment the alignment sensor audible alarm does not provide an indication of the relative distance between the hitch components 16 and 18, it is within the scope of the invention to provide an alarm that changes audible characteristics depending on the intensity of the reflected light. Such an alarm is controlled by a photo-switch assembly 38 that provides a light detect switch output that is proportional to the intensity of reflected light that is received. Examples of audible characteristics include tone, pitch, and frequency of beeps. The changing audible characteristics provide an indication of the relative distance between the hitch components 16 and 18.

Figure 9B:
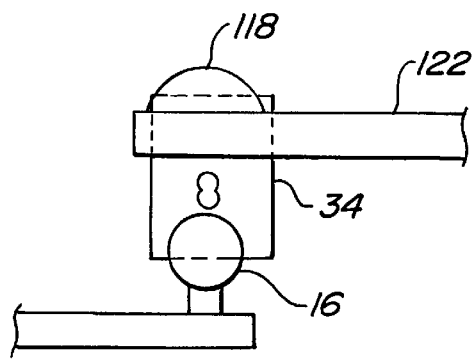
FIG. 9B is a first sectional view of the mounting arrangement of the proximity sensor.
Figure 9C:
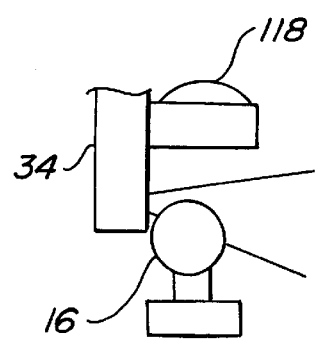
FIG. 9C is a second sectional view of the mounting arrangement of the proximity sensor.

Referring to FIGS. 9B and 9C in addition to FIG. 9A, the hitch component detection phase is illustrated. As the towing vehicle hitch component 16 begins to pass under the towed vehicle hitch component 18, the hitch component detection phase begins. The proximity sensor 34 emits a beam of light over a field of view that extends approximately perpendicular to the towed vehicle hitch component 18. As the towing vehicle hitch component 16 passes underneath the towed vehicle hitch component 18, the beam of light is reflected off of the hitch component 18 back towards the proximity sensor 34. The photo-switch 50 within the proximity sensor 34 detects the reflected light and in response controls the light detect switch 52 to provide power to the audible alarm 58. In the presently preferred embodiment the proximity sensor audible alarm 58 emits a different sound than the alignment sensor audible alarm 46, however it is within the scope of the invention for audible alarms 46 and 58 to emit the same sound upon activation. The activation of the second proximity sensor audible alarm alerts the vehicle operator that the hitch components 16 and 18 are aligned. Should the vehicle operator back-up too far, the alarm will halt. Only when the towing vehicle hitch component 16 is in close proximity to the towed vehicle hitch component 18 does the proximity sensor alarm sound.

Figure 10:
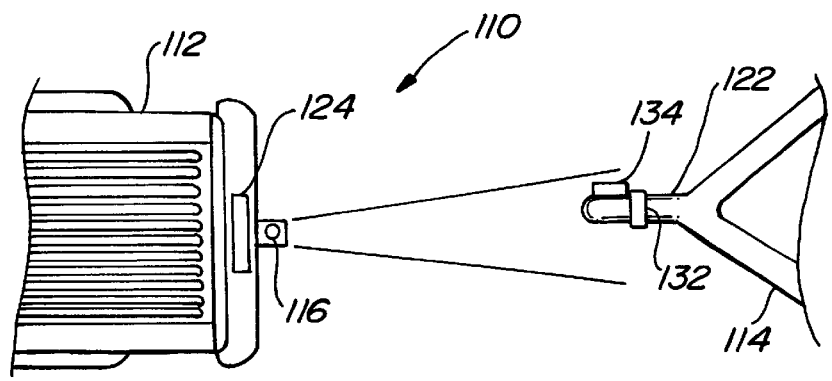
FIG. 10 is an overhead view of an alternative embodiment of the invention.

Referring to FIG. 10, another electronic hitching system 110 configured in accordance with the principles of the invention is illustrated. Hitching system 110 is similar to hitching system 10 in function with corresponding elements numbered in the range 110–199. Hitching system 110 differs from hitching system 10 in that a proximity sensor is not included and the photo-switch assembly 138 of the alignment sensor 124 is an analog retro-reflective photo-switch operating in echo mode. The photo-switch assembly 138 transmits a beam of light over a predetermined field of view and receives a reflected portion of the beam of light. A light detect switch 144 included in the photo-switch assembly has an output that varies in response to the intensity of the reflected light being detected. A battery 140 and control switch 142 connect in series with the photo-switch assembly 138 to provide controlled circuit power to the alignment sensor 124. An alarm 146 connected to the output of the light detect switch 144 provides an audible indication when the photo-switch assembly 38 detects reflected light. In this embodiment of the invention a variable tone alarm is employed, however the scope of the invention includes other alarms that vary an audible characteristic in response a varying output from the light detect switch 144, examples of other such alarms include intermittent alarms that vary the duration of each beep and vary the frequency of beeps.

In operation, the embodiment of the electronic hitching system 110 has one phase of operation, the alignment phase. Referring to FIG. 5, prior to the alignment phase an alignment sensor 124 and reflector 132 are mounted to the towing vehicle 112 and towed vehicle 114. The alignment sensor 124 is magnetically attached to the towing vehicle bumper assembly 120 to provide a beam of light having a field of view that extends outward over the towing vehicle hitch component 116. The reflector 132 is semi-permanently attached to an adjustment shaft 126 of the towed vehicle 114 to reflect the beam of light back towards the alignment sensor 124.

During the alignment phase, as the vehicle operator slowly backs the towing vehicle 112 towards the towed vehicle 114 the alignment sensor 124 emits an audible beep so long as the reflector 132 is within the field of view of the alignment sensor 124. The alignment sensor 124 emits a beam of infrared light over a field of view of about 5 degrees. When the towing vehicle is manoeuvred to bring the alignment sensor 124 within about 5 feet of the reflector 132, light emitted from the alignment sensor 124 reflects from the reflector 132 back along a path parallel to the incident light towards the alignment sensor 124. Although the preferred embodiment is limited to distances of 5 feet, the scope of the invention includes greater distances that are obtained by higher power photo-switch assemblies 138. The photo-switch assembly 138 within the alignment sensor 124 detects the intensity of the reflected light and in response controls the light detect switch 144 to supply power to an alarm 146. The alarm 146 provides a variable audible indication that reflected light is detected. The tone of the audible indication is varied in response to the intensity of reflected light that is detected. As the towing vehicle 112 nears the towed vehicle 114 the alignment cone narrows in width, leading the hitch components 116 and 118 towards alignment. At the same time, the audible indication varies indicating to the vehicle operator that the relative distance between the hitch components 116 and 118 is decreasing. By constantly adjusting the direction of the towing vehicle 112 to maintain the audible alarm and thereby remain within the alignment cone, the vehicle operator brings the hitch components 116 and 118 towards alignment. The alignment sensor alarm 146 continues to provide an increasing audible alarm as the towing vehicle hitch component 116 passes under the towed vehicle hitch component 118. The changing audible characteristic of the alarm 146 provides an indication of the relative position of the hitch components 116 and 118. The vehicle operator halts the towing vehicle 112 when the audible alarm increases to a level that indicates the hitch components are in alignment.

The hitching system provides an adaptable universal system for aligning a towing vehicle hitch component with a towed vehicle hitch component. The system minimizes the myriad problems associated with backing up a motor vehicle to a trailer for hitching and towing. Additionally, weather, lighting, or ground-surface conditions do not affect the performance of the hitching system. The system is wireless, providing a highly portable system that installs instantly and is small enough to fit into a glove compartment for storage. Also, the system when configured with magnetic attachments, is instantly mountable to any ferrous-metal surface. For special cases where ferrous-metallic surfaces are not available, Velcro tape is easily adapted for mounting purposes. If the system is inadvertently left in place after hitching up the trailer, the attachment points are strong enough to secure the assemblies during subsequent travel.

It should be understood that while this invention has been described in connection with particular examples thereof, no limitation is intended thereby since obvious modifications will become apparent to those skilled in the art after having the benefit of studying the foregoing specification, drawings and following claims.

What is claimed is:

1. A vehicle hitching system for facilitating an operator's maneuvering of a towing vehicle having a vehicle hitch component to align that vehicle hitch component in co-operative arrangement with a trailer hitch component carried on a towed vehicle to enable mechanical interconnection of the hitch components, comprising:

an alignment sensor attached to one of the towing vehicle or the towed vehicle such that said alignment sensor emits a light beam over a field of view;

a light reflector attached to the other of the towing vehicle or the towed vehicle at a predetermined location relative to the alignment sensor, said light reflector for reflecting a portion of the emitted light beam back along a path that is substantially parallel to the emitted light beam;

said alignment sensor emitting a first audible alarm in response to detecting the reflected portion of the emitted light beam that is substantially parallel to the emitted light beam; and whereby said first audible alarm indicates that the light reflector is within the field of view of the alignment sensor to indicate that the hitch components are moving towards alignment.

2. The vehicle hitching system of claim 1 wherein the alignment sensor is attached to one of the towing vehicle or the towed vehicle such that the field of view extends approximately in parallel with the hitch components when said hitch components are in co-operative alignment; and wherein the light reflector is attached to the other of the towing vehicle or the towed vehicle such that said reflector is approximately centered within the field of view of the alignment sensor when said hitch components are in co-operative alignment.

3. The vehicle hitching system of claim 2 wherein the alignment sensor further comprises an analog retro-reflective photoswitch for emitting the light beam and providing a variable output signal to the first alarm in response to detecting the reflected portion of the light beam that is substantially parallel to the emitted light beam, said reflected light beam having an intensity, wherein the variable output signal is proportional to the intensity of the reflected light beam;

whereby the first alarm provides a variable sound output representative of the intensity of the reflected light beam.

4. The vehicle hitching system of claim 3 wherein the first proximity sensor alarm is selected from the group of intermittent alarms, variable tone alarms, and variable pitch alarms.

5. The vehicle hitching system of claim 1 further comprising a proximity sensor attached to one of the towing vehicle or the towed vehicle for detecting the hitch component of the other of the towing vehicle or the towed vehicle; and said proximity sensor including a second alarm activable, in response to the proximity sensor detecting the hitch component of the other of the towing vehicle or the towed vehicle, for signalling that the towing vehicle hitch component is in co-operative alignment with the towed vehicle hitch component.

6. The vehicle hitching system of claim 5 wherein the proximity sensor is attached to said one of the towing vehicle or the towed vehicle such that the field of view extends approximately perpendicular to an axis through the hitch components when said hitch components are in co-operative alignment.

7. The vehicle hitching system of claim 5 wherein the alignment sensor further includes a digital retro-reflective photoswitch assembly for emitting the beam of light and controlling a light detect switch in response to detecting the portion of the reflected light beam that is substantially parallel to the emitted light beam.

8. The vehicle hitching system of claim 5 wherein the proximity sensor further comprises a diffuse photo-switch assembly for emitting a beam of light and controlling a light detect switch in response to detecting a reflected portion of the beam of light.

9. The vehicle hitching system of claim 5 wherein the proximity sensor further comprises an inductive proximity sensor assembly for emitting a magnetic field and activating the second alarm in response to detecting a variation in the magnetic field.

10. The vehicle hitching system of claim 1 wherein the alignment sensor is attached with a magnet.

11. The vehicle hitching system of claim 1 wherein the alignment sensor beam of light has a wavelength in the range from visible red to less than microwave.

12. The vehicle hitching system of claim 1 wherein the vehicle hitch component is a ball hitch.

13. The vehicle hitching system of claim 1 wherein the trailer hitch component is a ball-receiver hitch.

14. The vehicle hitching system of claim 1 wherein the light reflector is a retro-reflective reflector.

15. The vehicle hitching system of claim 5 wherein said alignment sensor is attached to the towing vehicle such that the field of view extends out over the towed vehicle hitch component;

said light reflector is attached to the towed vehicle such that said reflector is approximately centered within the field of view of the alignment sensor when the hitch components are in cooperative alignment; and said proximity sensor is attached to the towed vehicle.

16. The vehicle hitching system of claim 15 wherein said alignment sensor is attached to the towing vehicle approximately above the towing vehicle hitch component.

17. A vehicle hitching system for facilitating an operator's maneuvering of a towing vehicle having a ball hitch component to align that ball hitch component in co-operative arrangement with a ball-receiver hitch component carried on a towed vehicle to enable mechanical interconnection of the hitch components, comprising:

an alignment sensor magnetically attached to the towing vehicle such that said alignment sensor provides a field of view that extends approximately in parallel with the hitch components when said hitch components are in co-operative alignment, said alignment sensor including a retro-reflective photo-switch assembly for emitting a light beam across a predetermined field of view;

a reflector attached to the towed vehicle such that said reflector is substantially centered within the field of view of the first sensor when said hitch components are in co-operative alignment, said reflector reflecting a portion of the emitted light beam back along a path that is substantially parallel to the emitted light beam;

said alignment sensor further including a first alarm, responsive to said retro-reflective photo-switch assembly detecting the reflected portion of the emitted light beam that is substantially parallel to the emitted light beam, for sounding an audible alarm, whereby the alignment sensor audible alarm indicates that the reflector is within the field of view of the photo-switch assembly; and a proximity sensor magnetically attached to the towed vehicle such that the proximity sensor provides a field of view extending approximately perpendicular to an axis through the hitch components when said hitch components are in co-operative alignment, said proximity sensor detecting the ball hitch component of the towing vehicle, said proximity sensor including;

a diffuse photo-switch for emitting a light beam and controlling a second alarm in response to detecting a portion of the light beam reflected from the ball hitch component of the towing vehicle, the second alarm sounding an audible alarm;

wherein the proximity sensor audible alarm indicates that the towing vehicle ball hitch component is in co-operative alignment with the towed vehicle ball-receiver hitch component.

18. A method of facilitating an operator manuevering a towing vehicle having a vehicle hitch component to position that component in co-operative alignment with a trailer hitch component of a towed vehicle so that mechanical interconnection of the hitch components is enabled, comprising the steps of:

attaching an alignment sensor on one of the towing vehicle or the towed vehicle;

orienting the alignment sensor to provide a field of view that extends approximately in parallel with the hitch components when said hitch components are in co-operative alignment;

attaching a reflector to the other of the towing vehicle or the towed vehicle;

orienting the reflector such that a second axis extending through the alignment sensor and the reflector is approximately in parallel with the hitch components when said hitch components are in co-operative alignment;

attaching a proximity sensor on the towed vehicle;

emitting a beam of light from the alignment sensor;

controlling a first audible alarm in response to detecting a portion of the beam of light from the alignment sensor that is reflected off of the reflector and travels back along a path that is substantially parallel to the emitted beam of light, wherein the first audible alarm indicates the reflector is within the field of view of the alignment sensor;

sensing the vehicle hitch component when it passes within a predetermined distance from the proximity sensor; and controlling a second audible alarm in response to sensing the vehicle hitch component, whereby the second audible alarm indicates that the hitch components are in co-operative alignment.

* * * * *